US011210124B2

(12) United States Patent
Mohanta et al.

(10) Patent No.: US 11,210,124 B2
(45) Date of Patent: Dec. 28, 2021

(54) MOVEMENT OF VIRTUAL MACHINE DATA ACROSS CLUSTERS OF NODES

(71) Applicant: HEWLETT PACKARD ENTERPRISE DEVELOPMENT LP, Houston, TX (US)

(72) Inventors: Taranisen Mohanta, Bangalore (IN); Abhijith Umesh, Bangalore (IN); Sidharth Malakangoud Patil, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 234 days.

(21) Appl. No.: 16/245,574

(22) Filed: Jan. 11, 2019

(65) Prior Publication Data

US 2020/0225970 A1 Jul. 16, 2020

(51) Int. Cl.
*G06F 9/46* (2006.01)
*G06F 9/455* (2018.01)
*G06F 3/06* (2006.01)

(52) U.S. Cl.
CPC .......... *G06F 9/45558* (2013.01); *G06F 3/067* (2013.01); *G06F 3/0617* (2013.01); *G06F 3/0662* (2013.01); *G06F 2009/4557* (2013.01); *G06F 2009/45591* (2013.01)

(58) Field of Classification Search
CPC . G06F 3/0617; G06F 3/067; G06F 2009/4557
See application file for complete search history.

(56) References Cited

U.S. PATENT DOCUMENTS

| 9,594,579 | B2 | 3/2017 | Shiva et al. | |
| 9,612,765 | B2 | 4/2017 | Huang et al. | |
| 10,877,789 | B2* | 12/2020 | Ohnishi | G06F 9/45558 |
| 2008/0080497 | A1 | 4/2008 | Meijer et al. | |
| 2013/0091128 | A1* | 4/2013 | Radinsky | G06F 16/951 |
| | | | | 707/723 |
| 2015/0032894 | A1 | 1/2015 | Rosensweig et al. | |
| 2015/0143364 | A1 | 5/2015 | Anderson et al. | |
| 2015/0278433 | A1* | 10/2015 | Aihara | G16B 40/00 |
| | | | | 702/19 |
| 2016/0004552 | A1 | 1/2016 | Innan et al. | |
| 2019/0354438 | A1* | 11/2019 | Mohanta | G06F 11/1092 |
| 2019/0361750 | A1* | 11/2019 | Sequeira | G06F 9/4862 |
| 2019/0391739 | A1* | 12/2019 | Mueller | G06F 3/065 |

OTHER PUBLICATIONS

Changyeon Jo et al., "A Machine Learning Approach to Live Migration Modeling," SoCC'17, Sep. 2017, pp. 1-14, ACM.
Hewett Packard Enterprise, "HPE 3PAR Online Import software", Data Sheet, Feb. 2017, 8 pages.

* cited by examiner

*Primary Examiner* — Camquy Truong
(74) *Attorney, Agent, or Firm* — Hewlett Packard Enterprise Patent Department

(57) ABSTRACT

In an example, Virtual Machine (VM) attributes of a first VM are received. First VM data corresponding to the first VM is to be moved from a first cluster of nodes in which the first VM data is stored. Further, a movement value of the first VM is determined based on a movement model and the VM attributes of the first VM. The movement model indicates a dependence of movement value of a VM on VM attributes of the VM. The movement value of the first VM is indicative of a rank order for movement of the first VM data among a plurality of sets of VM data to be moved, where each set of VM data corresponds to a VM.

18 Claims, 10 Drawing Sheets

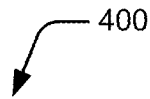

| S. NO | VM CLASS | LAST ACCESS | ACCESS FREQUENCY | RF | VM TYPE | SOURCE CLUSTER HEALTH | MOVEMENT VALUE |
|---|---|---|---|---|---|---|---|
| 1 | GOLD | HOT | HIGH | 1 | PRODUCTION | HEALTHY | LOW |
| 2 | GOLD | HOT | HIGH | 1 | PRODUCTION | DEGRADED | MEDIUM |
| 3 | GOLD | HOT | HIGH | 1 | PRODUCTION | CRITICAL | HIGH |
| 4 | GOLD | HOT | HIGH | 2 | PRODUCTION | HEALTHY | LOW |
| 5 | GOLD | VERY COLD | HIGH | 2 | PRODUCTION | DEGRADED | MEDIUM |
| 6 | GOLD | HOT | HIGH | 2 | PRODUCTION | CRITICAL | HIGH |
| 7 | GOLD | HOT | MEDIUM | 1 | TEST | HEALTHY | LOW |
| 8 | GOLD | HOT | MEDIUM | 1 | TEST | CRITICAL | LOW |
| 9 | GOLD | HOT | MEDIUM | 2 | TEST | DEGRADED | MEDIUM |
| 10 | GOLD | WARM | HIGH | 1 | PRODUCTION | CRITICAL | HIGH |
| 11 | GOLD | COLD | LOW | 2 | TEST | DEGRADED | LOW |
| 12 | GOLD | HOT | MEDIUM | 2 | DEV | DEGRADED | MEDIUM |
| 13 | SILVER | HOT | HIGH | 1 | PRODUCTION | CRITICAL | HIGH |
| 14 | SILVER | HOT | HIGH | 2 | PRODUCTION | DEGRADED | MEDIUM |
| 15 | SILVER | HOT | HIGH | 3 | TEST | HEALTHY | LOW |
| 16 | SILVER | HOT | MEDIUM | 3 | TEST | CRITICAL | LOW |
| 17 | SILVER | HOT | MEDIUM | 3 | PRODUCTION | DEGRADED | MEDIUM |
| 18 | SILVER | HOT | LOW | 2 | PRODUCTION | HEALTHY | LOW |
| 19 | SILVER | HOT | LOW | 1 | PRODUCTION | CRITICAL | MEDIUM |
| 20 | SILVER | HOT | LOW | 1 | DEV | DEGRADED | LOW |
| 21 | SILVER | HOT | LOW | 1 | TEST | HEALTHY | LOW |
| 22 | SILVER | WARM | HIGH | 1 | PRODUCTION | CRITICAL | HIGH |
| 23 | SILVER | COLD | LOW | 2 | TEST | CRITICAL | MEDIUM |
| 24 | BRONZE | HOT | HIGH | 3 | PRODUCTION | HEALTHY | LOW |
| 25 | BRONZE | HOT | HIGH | 1 | PRODUCTION | CRITICAL | LOW |
| 26 | BRONZE | HOT | HIGH | 1 | TEST | HEALTHY | LOW |
| 27 | BRONZE | HOT | LOW | 3 | PRODUCTION | DEGRADED | MEDIUM |
| 28 | BRONZE | HOT | LOW | 1 | PRODUCTION | CRITICAL | LOW |
| 29 | BRONZE | HOT | HIGH | 1 | PRODUCTION | CRITICAL | HIGH |
| 30 | BRONZE | VERY COLD | LOW | 3 | TEST | CRITICAL | LOW |

Fig. 4(a)

| DATA COPY DIFFERENTIAL FACTOR | CLUSTER HEALTH | NETWORK SPEED | WORKLOAD | PERFORMANCE | CLUSTER VALUE |
|---|---|---|---|---|---|
| LOW | SAFE | LOW | LOW | LOW | R1 |
| LOW | SAFE | LOW | LOW | MEDIUM | R1 |
| LOW | SAFE | LOW | MEDIUM | HIGH | R2 |
| LOW | UNSAFE | HIGH | LOW | LOW | R3 |
| LOW | UNSAFE | HIGH | MEDIUM | MEDIUM | R3 |
| HIGH | UNSAFE | HIGH | LOW | HIGH | R3 |
| HIGH | UNSAFE | LOW | HIGH | LOW | R2 |
| HIGH | SAFE | LOW | MEDIUM | MEDIUM | R2 |
| HIGH | SAFE | LOW | LOW | MEDIUM | R1 |
| HIGH | SAFE | HIGH | LOW | LOW | R2 |
| HIGH | UNSAFE | HIGH | HIGH | MEDIUM | R3 |
| LOW | UNSAFE | LOW | LOW | HIGH | R2 |
| HIGH | UNSAFE | HIGH | HIGH | LOW | R3 |
| LOW | SAFE | LOW | HIGH | MEDIUM | R1 |
| HIGH | SAFE | HIGH | LOW | LOW | R2 |
| HIGH | UNSAFE | HIGH | HIGH | HIGH | R3 |
| LOW | UNSAFE | HIGH | HIGH | HIGH | R3 |

Fig. 6(a)

MOVEMENT OF VIRTUAL MACHINE DATA ACROSS CLUSTERS OF NODES

BACKGROUND

A cluster of computing nodes, also referred to as cluster of nodes, includes a plurality of nodes that are connected over a communication network and managed together. For instance, resources of the plurality of nodes may be managed together as if they were from a single node. A Virtual Machine (VM), may be hosted on a cluster of nodes and data corresponding to the VM, also referred to as VM data, may be stored in the cluster of nodes. The cluster of nodes may be, for example, part of a hyperconverged system having a plurality of clusters of nodes. Sometimes, the VM data may be moved from the cluster of nodes it is stored in to another cluster of nodes. This may be performed, for example, to facilitate movement of the VM from the cluster of nodes to the other cluster of nodes or to create a backup of the VM data.

BRIEF DESCRIPTION OF DRAWINGS

The following detailed description references the figures, wherein:

FIG. 4(*b*) illustrates a decision tree generated using a VM attribute table, according to an example implementation of the present subject matter.

FIG. 6(*b*) illustrates a decision tree, according to an example implementation of the present subject matter.

DETAILED DESCRIPTION

Figure 1:
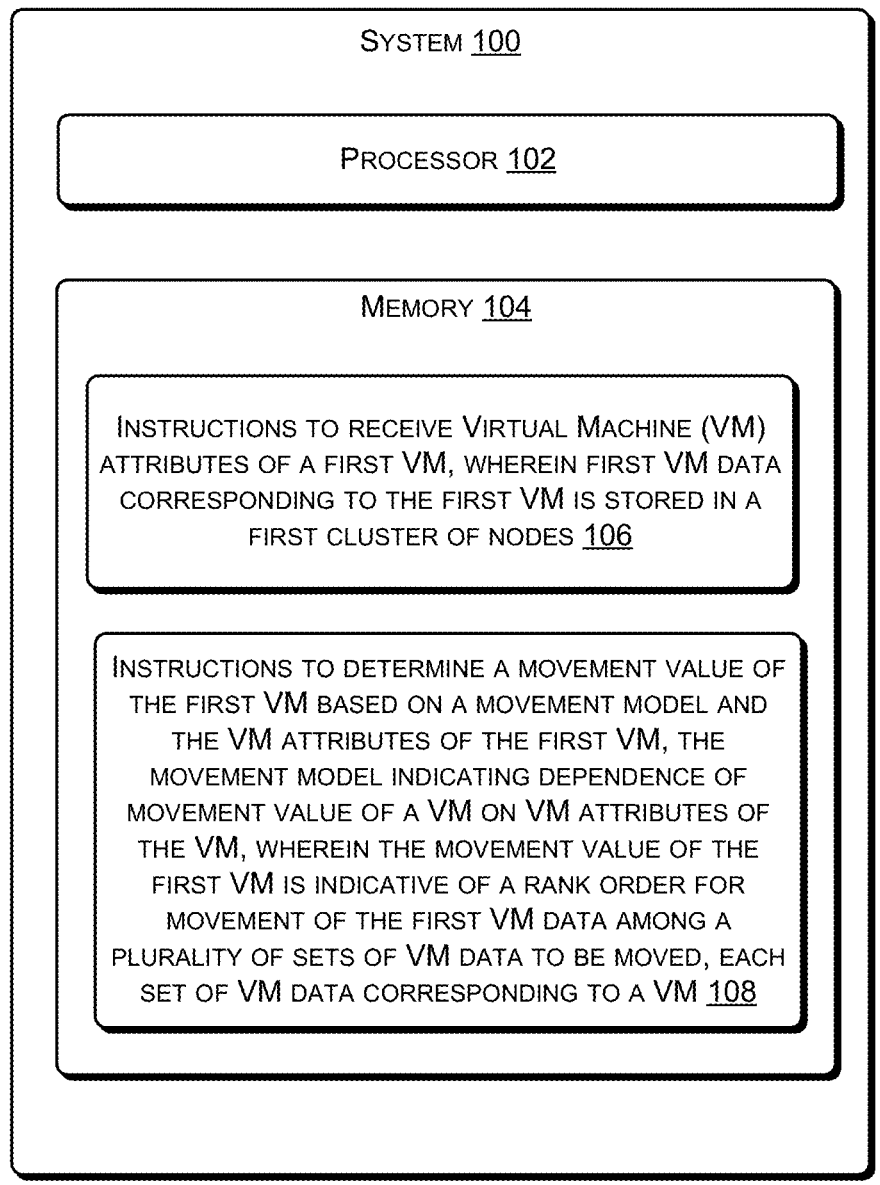
FIG. 1 illustrates a system to facilitate movement of virtual machine (VM) data corresponding to a VM across clusters of nodes, according to an example implementation of the present subject matter.

Multiple computing nodes, also referred to as nodes, may be managed together as a cluster of nodes. For example, storage, memory, and processing resources of the computing nodes may be managed together. Such a management increases performance and availability compared to managing nodes separate entities. For instance, a computationally intensive workload may utilize processing resources from more than one node of the cluster. Further, even if one node of the cluster fails, other nodes may still cater to workloads hosted by the cluster. A cluster of nodes may be used to store data corresponding to a Virtual Machine (VM), also referred to as data of VM or VM data. Such a cluster may also host the VM.

Sometimes, VM data of a VM stored in a first cluster may have to be moved from the first cluster. The movement of the VM data may have to be performed, for example, in response to a determination that the VM is to be moved from the first cluster, such as due to reduced performance of the VM in the first cluster. As another example, VM data may have to be moved from the first cluster to create a backup of the VM data in another cluster (i.e., without deleting the VM data in the first cluster, in some instances). Similarly, VM data that corresponds to another VM and that is stored in the first cluster may also have to be moved from the first cluster.

In some cases, data of one VM stored in the first cluster may have to be moved before data of another VM stored in the first cluster. For example, data of a VM used in production environment may have to be moved before data of another VM that is used for testing purposes. Further, data of a VM servicing a higher number of Input/Output (I/O) requests may have to be moved before data of another VM that is serving a relatively lower number of I/O requests.

The present subject matter relates to movement of data of VMs. With the implementations of the present subject matter, VMs may be rank ordered based on their attributes for movement of their respective data. Further, a target cluster to which the VM data is to be moved may also be selected based on attributes of clusters.

In accordance with an example implementation, attributes of a first Virtual Machine (VM), also referred to as VM attributes, are received. The first VM may be hosted on a first cluster of nodes and data corresponding to the first VM, interchangeably referred to as data of the first VM or first VM data, may be stored in the first cluster of nodes. The first cluster of nodes is also referred to as the first cluster. The first VM data may have to be moved from the first cluster, for example, in response to a determination that the first VM is to be migrated from the first cluster. The first VM, in turn, may have to be migrated from the first cluster, for example, due to a reduced performance of the first cluster, causing a reduced performance of the first VM.

For moving the first VM data, a movement value of the first VM is determined based on a movement model and the VM attributes of the first VM. The movement model indicates dependence of movement value of a VM on VM attributes of the VM. The movement value of the first VM is indicative of a rank order for movement of the first VM data among a plurality of sets of VM data to be moved, where each set of VM data corresponds to a VM. For example, the plurality of sets of VM data may include the first VM data and second VM data corresponding to a second VM hosted on the first cluster of nodes. Depending on the movement value of the first VM and of the second VM, the first VM data and the second VM data may be rank ordered for movement from the first cluster of nodes.

In an example, prior to moving the first VM data, a cluster to which the first VM data is to be moved is selected from among a plurality of clusters. The selection of the cluster may be based on a cluster value of each cluster. The cluster value of a cluster may be determined based on a cluster model that indicates dependence of cluster value of a cluster on a plurality of attributes of the cluster.

The present subject matter provides an efficient manner of ordering data of VMs for their movement. Since VMs are ranked based on their respective attributes for movement of data associated with the VMs, the present subject matter ensures that data of VMs of a higher priority are moved earlier. For example, data of a VM servicing greater number of I/O requests may be moved prior to data of a VM serving lesser number of I/O requests. This may reduce downtime of VMs and a time for which the VMs are operating at reduced performance.

Further, the present subject matter provides an automated manner of ordering VMs for moving data of the VMs. For instance, an administrator of a data center does not have to determine the order of movement of VM data. Therefore, a large number of VM attributes can be considered for ranking the VMs, thereby making the movement process highly efficient. Further, the automated manner also prevents errors associated with manual ordering of the VMs. The movement process of the present subject matter also facilitates complying with the various Service Level Agreement (SLA) parameters of the VMs.

Also, the present subject matter also enables rank ordering of clusters based on attributes of the cluster and selecting a target cluster for storing the VM data based on the rank order. Accordingly, the VM data may be moved to a cluster that is suitable for storing the VM data.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Example implementations of the present subject matter are described with regard to nodes of a hyperconverged system. Although not described, it will be understood that the implementations of the present subject matter can be used for any cluster of nodes in which VM data is stored in a cluster of nodes and is moved across clusters.

FIG. 1 illustrates a system 100 to facilitate movement of virtual machine (VM) data corresponding to a VM across clusters of nodes, according to an example implementation of the present subject matter. The system 100 may be implemented as any of a variety of computing systems, such as a desktop computer, a laptop computer, a server, a tablet, and the like. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in the memory 104. The computer-readable instructions, hereinafter referred to as instructions, includes instructions 106 and instructions 108. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable receiving attributes of a first VM (not shown in FIG. 1). The attributes of a VM may be referred to as VM attributes. Data corresponding to the first VM, interchangeably referred to as data of the first VM, first VM data, or first set of VM data, may be stored in a first cluster of nodes. The first cluster of nodes is also referred to as a first cluster (not shown in FIG. 1). The first VM may also be hosted on the first cluster. The first VM data may have to be moved from the first cluster. The movement of the first VM data may have to be performed, for example, to back up the first VM data or in response to a determination that the first VM is to be migrated from the first cluster.

When the instructions 108 are executed, a movement value of the first VM may be determined based on a movement model and the VM attributes of the first VM. The movement model may indicate dependence of movement value of a VM on VM attributes of the VM. The movement value of the first VM may be indicative of a rank order for movement of the first VM data among a plurality of sets of VM data to be moved, where each set of VM data corresponds to a VM. For example, the plurality of sets of VM data may include the first VM data and second VM data. The second VM data may correspond to a second VM that is hosted on the first cluster. Depending on their respective movement values, the first VM and the second VM may be rank ordered. The terms rank ordering of VMs and rank ordering data of VMs may be used interchangeably. Based on the rank ordering, the first VM data may be moved before or after the second VM data.

In an example, if the movement of the first VM data is performed for creating backup of the first VM data, the movement may involve a copying the first VM data to a target cluster, i.e., the cluster to which the first VM data is moved (and without deleting in the VM data from the first cluster, in some examples). If the movement of the first VM data is performed in response to a determination to migrate the first VM, the movement of the first VM data may involve migrating the first VM data to the target cluster from the first cluster.

The movement model, determination of the movement value, and other aspects of the present subject matter will be explained in greater detail in the subsequent paragraphs.

Figure 2:
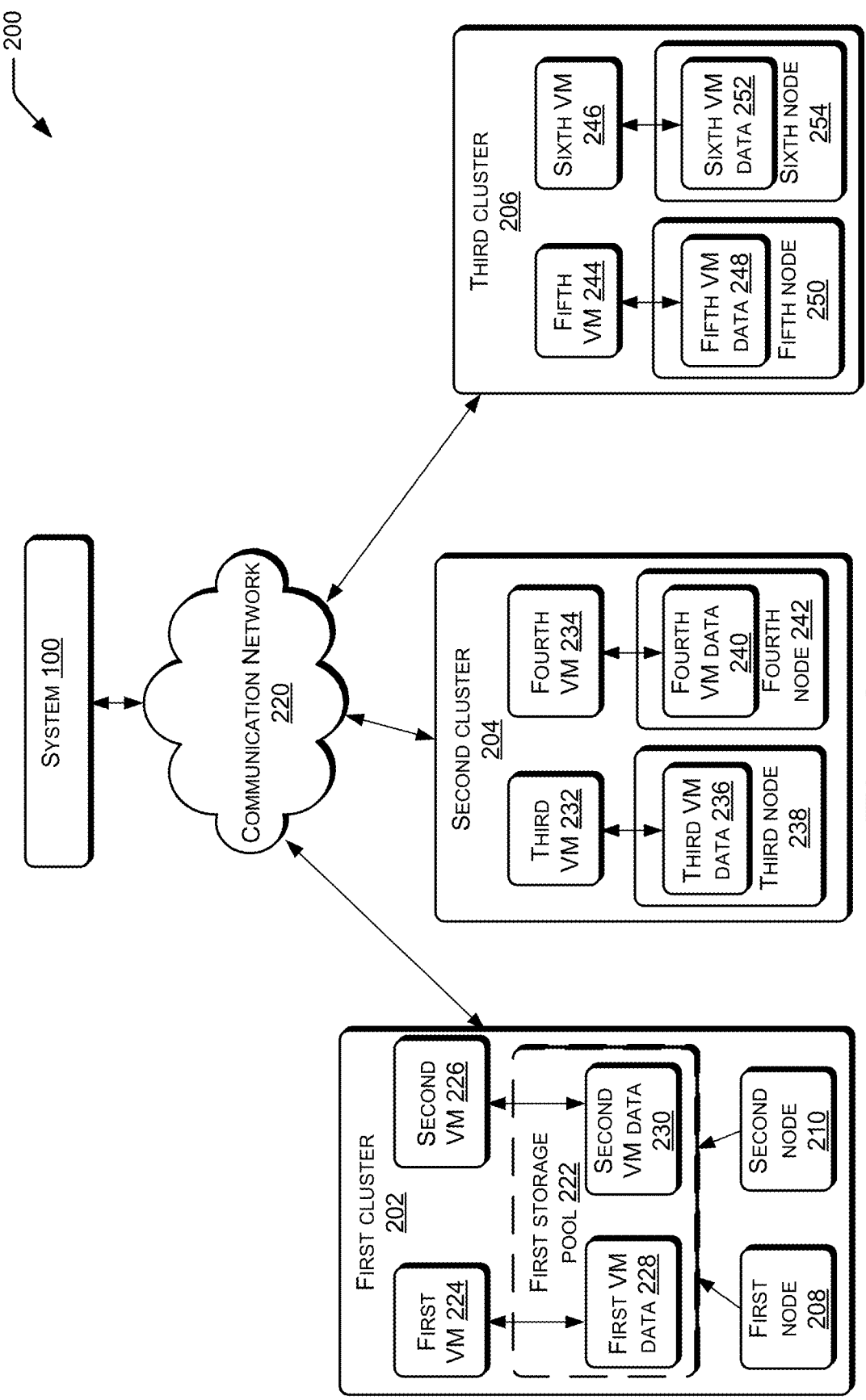
FIG. 2 illustrates a computing environment in which movement of data of VMs is performed, according to an example implementation of the present subject matter.

FIG. 2 illustrates a computing environment 200 in which movement of data of VMs is performed, according to an example implementation of the present subject matter. The computing environment 200 includes the system 100 and a first cluster 202. In addition, the computing environment 200 includes a plurality of other clusters, such as a second cluster 204 and a third cluster 206. A cluster may be a collection of computing nodes, also referred to as nodes, located at a single physical site or distributed across multiple physical sites, connected over a communication network, and collectively managed together. Accordingly, each cluster may include a plurality of nodes. For instance, the first cluster 202 may include a first node 208 and a second node 210, the second cluster 204 may include a third node 212 and a fourth node 214, and the third cluster 206 may include a fifth node 216 and a sixth node 218. Each node may be, for example, a commercial off-the-shelf (COTS) server. Further, each cluster may be part of a data center. For example, the first cluster 202 may be part of a first data center, the second cluster 204 may be part of a second data center, and the third cluster 206 may be part of a third data center. In another example, more than one cluster may be part of a single data center.

In an example, the computing environment 200, including the clusters 202-206, may be part of a hyperconverged system, which includes virtualized computing (hypervisor), virtualized storage (software-defined storage), and virtualized networking (software-defined networking). Accordingly, each node of the computing environment 200 may be a hyperconverged node and each cluster may be a hyperconverged cluster. Further, the computing environment 200 may be a federation of hyperconverged clusters.

The clusters 202-206 may be interconnected among each other and to the system 100 through a communication network 220. The communication network 220 may be a wireless or a wired network, or a combination thereof. The communication network 220 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 220 includes various network entities, such as transceivers, gateways, and routers.

Each cluster is capable of storing data. For instance, each node of each cluster may include a storage, such as a hard disk drive (HDD), a solid-state disk drive (SSD), a combination of HDD and SSD, or any other persistent storage. In an example, the storage of all nodes of a cluster may be managed as a single storage pool. For instance, the storage of the first node 208 and of the second node 210 of the first cluster 202 may be managed as a first storage pool 222 of the first cluster 202. The creation of the first storage pool 222 from the first node 208 and the second node 210 is depicted by the arrows from the first node 208 and from the second node 210 to the first storage pool 222. Further, the first storage pool 222 is shown dotted to indicate that the first storage pool 222 is a virtual entity created from storage of different nodes.

The storage pool of a cluster may be used to store data corresponding to VMs. The VMs may be VMs that are hosted on the cluster. Here, data corresponding to a VM may include data that is used for the operation of the VM or during the operation of the VM, such as data to be processed. The data corresponding to a VM may also include a snapshot of the VM. The storage of VM data is illustrated with the help of data of a first VM 224 and second VM 226, which are hosted on the first cluster 202. The data of the first VM 224 is referred to as the first VM data 228 and the data of the second VM 226 is referred to as the second VM data 230. As illustrated, the first VM data 228 and the second VM data 230 are exposed to their respective VMs through the first storage pool 222.

In another example, the storage of different nodes of a cluster may not be managed together as a pool. In such a case, the VM data of a particular VM may be stored in a particular node. This is illustrated in the second cluster 204 and the third cluster 206. As illustrated, the second cluster 204 hosts a third VM 232 and a fourth VM 234, third VM data 236 corresponding to the third VM 232 is stored in a third node 238 of the second cluster 204, and fourth VM data 240 corresponding to the fourth VM 234 is stored in a fourth node 242 of the second cluster 204. Similarly, the third cluster 206 hosts a fifth VM 244 and a sixth VM 246, fifth VM data 248 corresponding to the fifth VM 244 is stored in a fifth node 250 of the third cluster 206, and sixth VM data 252 corresponding to the sixth VM 246 is stored in a sixth node 254 of the third cluster 206.

In some cases, the first VM data 228 may have to be moved from the first cluster 202 to another cluster. The movement of the first VM data 228 may have to be performed for various reasons, such as in response to a determination that the first VM 224 is to be migrated from the first cluster 202, to create backup copies of the first VM data 228, and the like. The migration of the first VM 224, in turn, may have to be performed for various reasons, such as degradation in health of the first cluster 202, deletion of the first cluster 202 from the federation of clusters, load balancing, degraded performance of the first VM 224 (i.e., the first VM 224 unable to meet its Service Level Agreement (SLA) parameters), and a predicted natural disaster in a geographical area in which a data center having the first cluster 202 is situated. In addition to the first VM data 228, data of the other VMs may also have to be moved. For instance, data of other VMs hosted on the first cluster 202 may have to be moved from the first cluster 202 for any of the aforementioned reasons.

In some cases, data of one VM may have to be moved before data of another VM. For example, consider that the first VM 224 is running on a production environment, while the second VM 226 is running on a test environment. In such a case, the first VM 224 may have to be migrated prior to the second VM 226. Correspondingly, the first VM data 228 may have to be moved from the first cluster 202 prior to the second VM data 230. As another example, consider that the first cluster 202 is overloaded, due to which the performance of the first VM 224 and the second VM 226 are degraded. Consider also that the first VM 224 is servicing greater number of I/O requests compared to the second VM 226. In such a case, the first VM data 228 may have to be moved before the second VM data 230, to ensure that the performance of the first VM 224 is restored to its optimum level quicker. To determine data of which VM is to be moved first, a movement value may be determined for each VM. The movement value indicates the order in which VM data of different VMs are to be moved. The determination of the movement value will be explained with reference to FIG. 3.

Although FIG. 2 is explained with reference to a scenario in which a VM is hosted on the same cluster that stores data of the VM, in some cases, the VM data and the VM may be on different clusters, and VM may be receiving its data over the communication network 220. Even in such cases, the VM data may have to be moved from one cluster to another, for example, due to delay in receiving the VM data from the cluster that stores the VM data. Accordingly, the movement value may be determined for such VM using the present subject matter.

Figure 3:
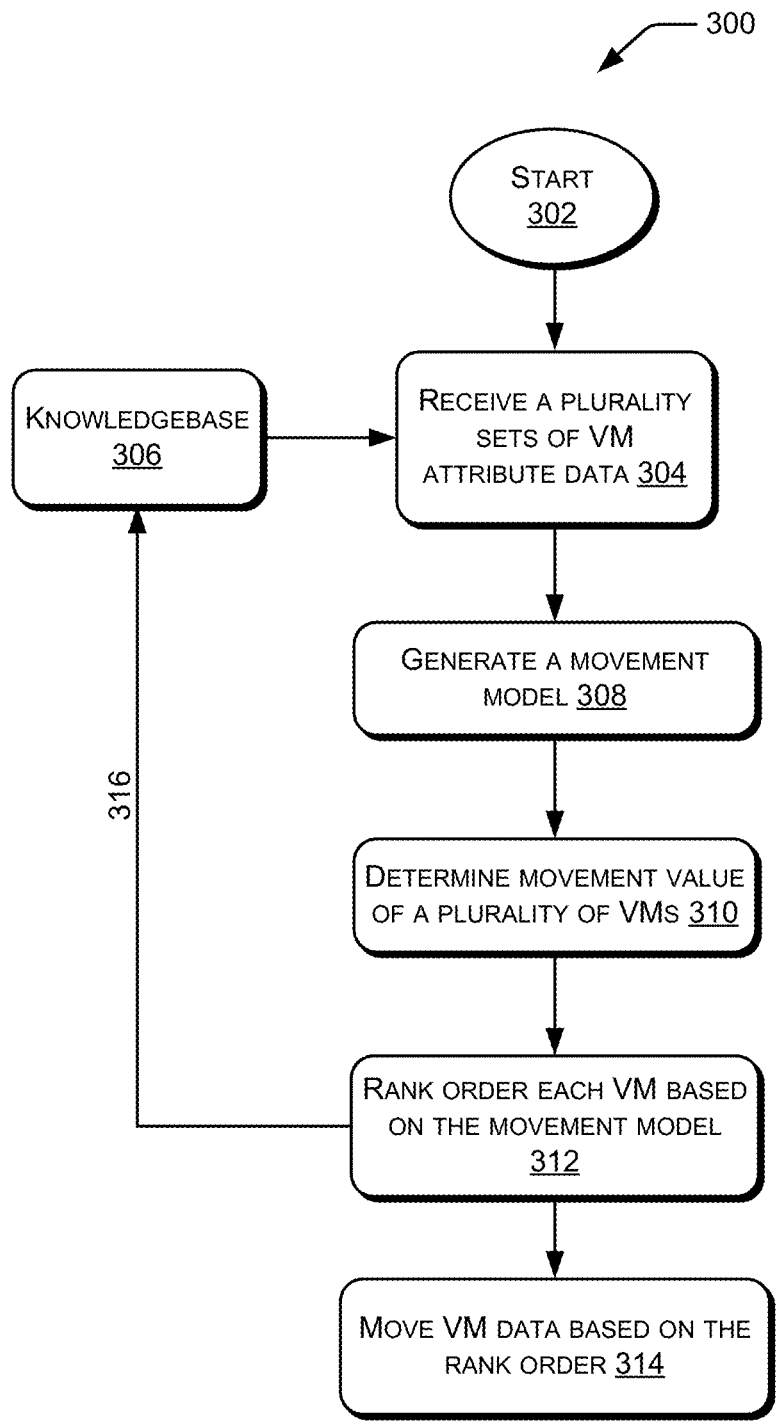
FIG. 3 illustrates a method for determining an order for movement of VM data of various VMs, according to an example implementation of the present subject matter.

FIG. 3 illustrates a method 300 for determining an order for movement of VM data of various VMs, according to an example implementation of the present subject matter.

The order in which the method 300 is described is not intended to be construed as a limitation, and any number of the described method blocks may be combined in any order to implement the method 300, or an alternative method.

Furthermore, the method 300 may be implemented by processor(s) or computing device(s) through any suitable hardware, non-transitory machine-readable instructions, or a combination thereof.

It may be understood that steps of the method 300 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

Referring to method 300, the method begins at block 302. Subsequently, at block 304, a plurality of sets of VM attribute data is received. Each set of VM attribute data corresponds to a reference VM and includes a plurality of VM attributes of the reference VM and a reference movement value of the reference VM. The plurality of VM attributes may include, for example, replication factor, frequency of access, VM type, last access, VM class, and health of a cluster of nodes that hosts the VM ("source cluster"), as will be explained in detail with reference to FIG. 4(a). Accordingly, the plurality of attributes of the first VM 224 may be replication factor of the first VM 224, frequency of access of the first VM 224, VM type of the first VM 224, last access of the first VM 224, VM class of the first VM 224, and health of the first cluster 202, which hosts the first VM 224. The plurality of sets of VM attribute data may be part of a knowledgebase 306. The knowledgebase 306 may include a plurality of sets of VM attribute data from the past.

At block 308, dependence of movement value of a VM on the plurality of VM attributes of the VM is modelled based on the plurality of sets of VM attribute data. Accordingly, the movement model is generated. The generation of the movement model will be explained with reference to FIG. 4(a).

At block 310, movement value of each of a plurality of VMs is determined based on the movement model. In an example, the plurality of VMs may be VMs that are hosted on a cluster, such as the first cluster 202, and may include, for example the first VM 224 and the second VM 226. Further, VM attributes of the plurality of VMs may be received in response to a determination that they are to be migrated from the cluster. The determination of the movement value will be explained with reference to FIG. 4(b). In an example, the receiving of the VM attributes and the determination of the movement values may be initiated in response to a detection that the health of a source cluster, i.e., the cluster on which the VMs are hosted, is degraded.

At block 312, the plurality of VMs may be rank ordered based on their respective movement values. For example, when the first VM 224 has a better movement value compared to the second VM 226, the first VM 224 may be ranked higher than the second VM 226, i.e., the first VM data 228 is ranked higher than the second VM data 230. The rank order may specify an order in which VM data of the different VMs are to be moved.

At block 314, the VM data of the plurality of VMs may be moved based on the rank order. For example, if the first VM 224 is ranked higher than the second VM 226, the first VM data 228 may be moved from the first cluster 202 before the second VM data 230. As mentioned earlier, the movement of the first VM data 228 and the second VM data 230 may involve migration of the first VM data 228 and the second VM data 230, respectively, from the first cluster 202, or may involve creation of backup copies of the first VM data 228 and the second VM data 230 in the target cluster.

In an example, the VM attributes of each of the plurality of VMs and their corresponding movement values may be stored in the knowledgebase 306, as indicated by the arrow 316. For example, the VM attributes of the first VM 224 and the movement value assigned to the first VM 224 may be appended to the plurality of sets of VM attribute data. Accordingly, the VM attributes of the plurality of VMs and their corresponding movement values are added to the plurality of sets of VM attribute data. In this manner, the knowledgebase 306 is continuously updated with new sets of VM attribute data.

FIG. 4(a) illustrates a VM attribute table 400 having the plurality of sets of VM attribute data, according to an example implementation of the present subject matter. The VM attribute table 400 may be part of the knowledgebase 306.

Each row of the VM attribute table 400 depicts a set of VM attribute data of a reference VM. Although the VM attribute table 400 is shown to have sets of data corresponding to 30 reference VMs, the VM attribute table 400 may have more number of sets of VM attribute data as well. Further, each column of the VM attribute table 400 corresponds to a VM attribute of a plurality of VM attributes. As mentioned earlier and illustrated by the columns of the VM attribute table 400, the plurality of VM attributes may include VM class, last access, frequency of access (Access Frequency), replication factor (RF), VM type, and source cluster health.

Class of a VM may indicate a performance demand that is to be met with by the VM. The class of the VM may be determined based on service level agreement (SLA) parameters corresponding to the VM. For example, if the SLA parameters corresponding to a VM demand a high network speed, high processing speed, minimal downtime, and the like, the VM class of the VM may be gold. Correspondingly, for moderate and lesser performance demands, the VM class may be silver and bronze, respectively. Last access indicates how long ago the VM was last accessed. The last access may be hot, if the VM was accessed not so long ago, warm, if the VM was accessed a fair amount of time ago, cold or very cold, if the VM was accessed a long time ago. In an example, the last access may be hot if the VM was accessed within the last 60 minutes, warm if the VM was last accessed anytime between the last 60 minutes and the last 10 days, cold if the VM was last accessed anytime between the last 10 days and 6 months, and very cold if the VM was last accessed more than 6 months ago. In other examples, the last access may be classified with a finer granularity, such as into categories of very hot, hot, very warm, warm, cold, very cold, and the like. Frequency of access indicates how frequently the VM is accessed. The access may be for Input/Output (I/O) requests. The frequency of access may be classified as high, medium, or low. The RF of a VM refers to the number of copies of the VM data stored in a cluster, such as the first cluster 202. Accordingly, the RF for a VM may have a numeral value of 1, 2, 3, 4, or more. For instance, an RF of 1 indicates that a single copy of the VM data is stored in the cluster. Type of a VM indicates an environment at which the VM is deployed, such as a production environment, development environment, or test environment. Accordingly, the VM type may be production, development (abbreviated as "dev"), or test. The source cluster health may include health of various nodes and components of the cluster on which the VM is hosted, such as the first cluster 202.

The VM attributes of a VM may be characteristics of the VM that may be used to determine how soon data of the VM is to be moved. For example, the VM attributes of VM class and VM type may indicate the amount of permissible downtime for the VM. Further, the attributes of VM access frequency and last access indicate the degree of impact due to downtime of the VM. Still further, the VM attribute of RF indicates the number of node failures that a set of VM data can tolerate. For example, if the RF of a VM is 2, indicating that two copies of the VM data of the VM is stored in a cluster, in case of a degraded health of the cluster, the VM data is to be moved faster compared to another VM having a RF of 3. Although the VM attributes are explained with reference to the aforementioned examples, the VM attributes may include other attributes that may indicate the urgency with which VM data is to be moved.

In addition to the VM attributes of the reference VM, each set of VM attribute data may also include a pre-assigned movement value of the reference VM. The movement value of a VM is indicative of rank order for movement of data of the VM among a plurality of sets VM data. For example, the data of a VM having a movement value of "high" is to be moved before the data of a VM having a movement value of "medium" or "low". The movement value assigned to a reference VM will be hereinafter referred to as a reference movement value. The reference movement value may be assigned to a reference VM, for example, by an administrator of the cluster 202 or a customer that has purchased the reference VM based on the VM attributes of the reference VM.

Though each set of VM attribute data includes the VM attributes of the reference VMs and their respective reference movement values, the VM attribute table 400 does not provide meaningful insights into the impact of each VM attribute data on the reference movement value. Also, the VM attribute table 400 may not provide the reference movement value for all possible combinations of the VM attributes. For example, the VM attribute table 400 does not specify the reference movement value for a VM class of gold, last access of medium, access frequency of high, RF of 2, VM type of test, and a source cluster health of degraded. Further, two sets of VM attribute data in the VM attribute table 400 may contradict with each other. For example, for the same set of combinations of VM attributes, a first set of VM attribute data may have a reference movement value of low, while a second set of VM attribute data may have a reference movement value of high.

To derive meaningful insights out of the plurality of sets of VM data and to be able to determine movement values of VMs having varied combinations of VM attributes, the present subject matter generates a movement model based on the plurality of sets of VM data. The movement model may indicate the dependence of movement value of a VM on VM attributes of the VM. In an example, the movement model may be a decision tree corresponding to the plurality of sets of VM data. A decision tree is a is a tool that can be used to make decisions or classifications and uses a tree-like model of decisions and their possible outcomes. The decision tree includes decision nodes and leaf nodes. A decision node has two or more branches and a leaf node represents a classification or decision. A topmost decision node in the decision tree is called a root node. The decision tree and the generation of the decision tree will be explained with reference to FIG. 4(b).

Figure 4B:
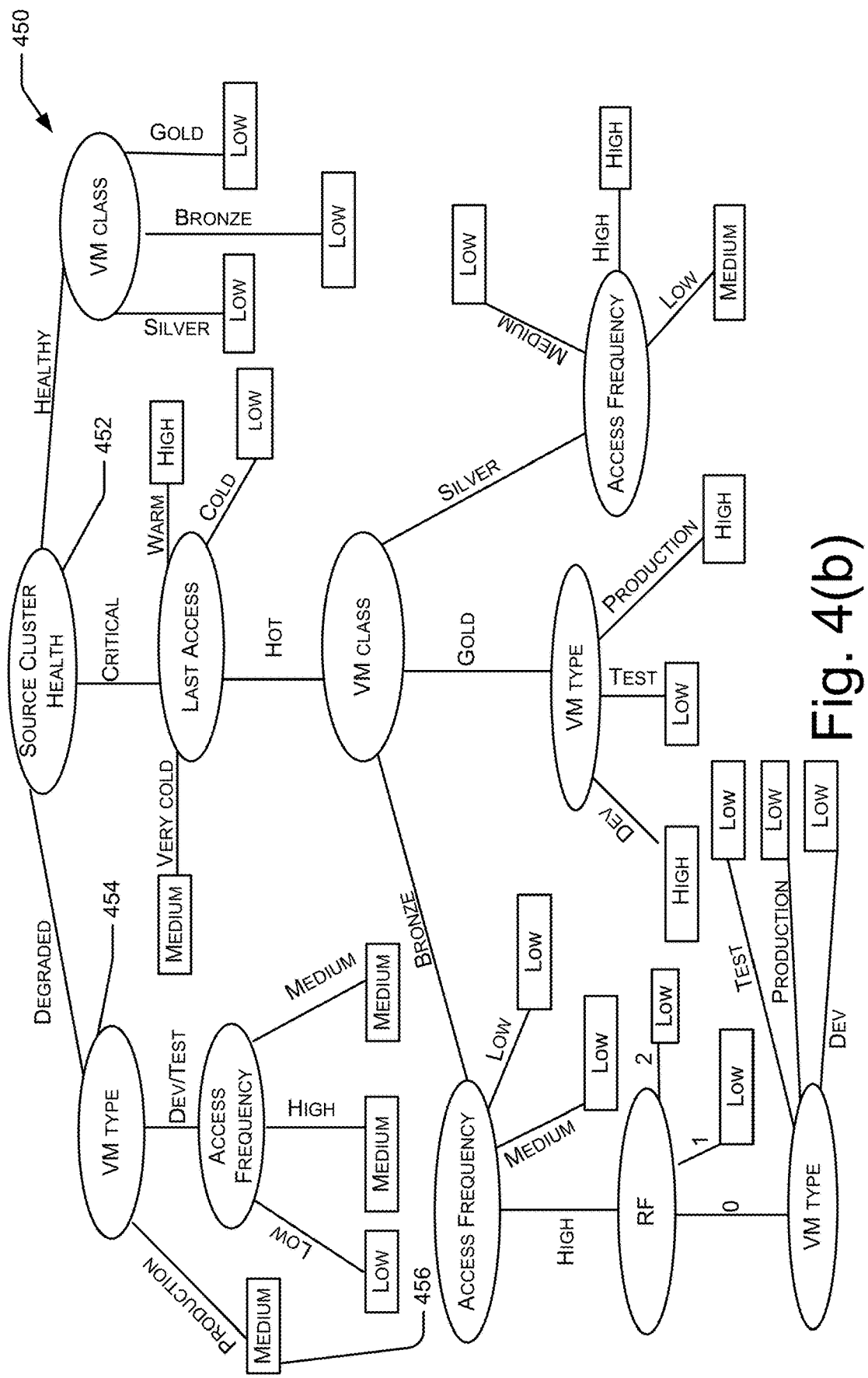
FIG. 4(*a*) illustrates a VM attribute table having a plurality of sets of VM attribute data, according to an example implementation of the present subject matter.

FIG. 4(b) illustrates the decision tree 450 generated using the VM attribute table 400, according to an example implementation of the present subject matter.

To generate the decision tree, two parameters, namely entropy and information gain, are used. The entropy provides a measure of homogeneity of a sample. For example, if the sample is homogeneous, the entropy is zero and if the sample is equally divided, the entropy of the sample is one. The generation of the decision tree from the plurality of sets of VM data will be explained below:

To generate the decision tree, two types of entropies are to be computed. First type of entropy is computed using frequency table of one column of the VM attribute table 400. The column may be the target, i.e., the movement value. The first type of entropy may be computed using the below equation:

$$H(S) = -\sum_{x \in X} p(x) \log_2 p(x) \quad (1)$$

where S refers to the target, i.e., the movement value, and p(x) refers to a percentage distribution of each category of the target, i.e., high, medium, or low. In the VM attribute table 400, since the total number of samples is 30, of which 6 samples have a movement value of high, 9 have a movement value of medium, and 15 have a movement value of low, the entropy of the target may be computed as below:

$$H \text{ (Movement value)} = -6/30*\log_2(6/30) - 9/30*\log_2(9/30) - 15/30*\log_2(15/30) = 1.485475 \quad (2)$$

The second type of entropy is computed using frequency table of two columns of the VM attribute table 400. Of the two columns, one of the column will be the target, and the other column may be any of the other columns of the VM attribute table 400, i.e., any of the VM attribute. The second type of entropy may be computed using the below equation:

$$H(S,T) = \Sigma_{t \in T} p(t) H(S_t) \quad (3)$$

where T is a VM attribute present in a column of a VM attribute table 400 and t is a category of the VM attribute. The calculation of the second type of entropy will be explained with the help of the VM attribute of VM class (T=VM Class) below:

If the VM attribute is VM class, t may be gold, silver, or bronze. Of the 30 samples in the VM attribute table 400, 12 samples have a class of gold, 11 have a class of silver, and 7 have a class of bronze. Of the 12 samples that have a class of gold, 5 samples have a movement value of low, 4 samples have a movement value of medium, and 3 samples have a movement value of high. Of the 11 samples that have a class of silver, 5 samples have a movement value of low, 4 samples have a movement value of medium, and 2 samples have a movement value of high. Further, of the 7 samples that have a class of bronze, 5 samples have a movement value of low, 1 sample has a movement value of medium, and 1 sample has a movement value of high. Accordingly, the second type of entropy may be calculated as below:

$$H \text{ (Migration Value, VM class)} = 12/30*H \text{ (Migration Value}_{Gold}) + 11/30*H \text{ (Migration Value}_{Silver}) + 7/30*H \text{ (Migration Value}_{Bronze}) \quad (4)$$

As will be understood, H (Movement Value$_{Gold}$), H (Movement Value$_{Silver}$), and H (Movement Value$_{Bronze}$) can be computed based on equation (1), as explained below:

$$H \text{ (Movement Value}_{Gold}) = -5/12*\log_2(5/12) - 4/12*\log_2(4/12) - 3/12*\log_2(3/12) = 1.554585 \quad (5)$$

$$H \text{ (Movement Value}_{Silver}) = -5/11*\log_2(5/11) - 4/11*\log_2(4/11) - 2/11*\log_2(2/11) = 1.494919 \quad (6)$$

$$H \text{ (Movement Value}_{Bronze}) = -5/7*\log_2(5/7) - 1/7*\log_2(1/7) - 1/7*\log_2(1/7) = 1.148835 \quad (7)$$

Substituting equations (5)-(7) in equation (4), we get $$H \text{ (Movement value, VM class)}=12/30*1.554585+ \\ 11/30*1.494919+7/30*1.148835=1.438032 \quad (8)$$

In the above manner, the second type of entropy may be computed for all other VM attributes present in the columns of the VM attribute table 400. For instance, the second type of entropy H (S, T) may be computed for T=RF, frequency of access, VM type, last access, and source cluster health.

Upon computing the two types of entropy, information gain (IG) may be computed corresponding to each VM attribute. Information gain may be computed as per the below equation:

$$IG(S,T)=H\ (S)-H\ (S,T) \quad (9)$$

As will be understood, IG may be computed corresponding to each VM attribute using the second type of entropy (H (S, T)) computed in the manner as explained with reference to equations (4)-(8) and using the first type of entropy (H (S)) computed in the manner as explained with reference to equations (1) and (2). The IG computed for the VM attributes are depicted in the Table 1 below:

TABLE 1

Information Gain corresponding to various VM Attributes

| VM Attribute (T) | Information Gain (IG) |
| --- | --- |
| Class | 0.047443 |
| Replication factor | 0.702323249 |
| Frequency of access | 0.249047202 |
| Type | 0.365594136 |
| Last access | 0.897464183 |
| Source cluster health | 1.06955284 |

Since source cluster health has the highest information gain, source cluster health is determined to be the root node 452 of the decision tree 450. This completes the first iteration in the generation of the decision tree 450. Subsequently, a separate IG is computed for each category of source cluster health. For instance, a sub-table of the VM attribute table 400 when the source cluster health is "degraded" is depicted below:

TABLE 2

Sub-table of VM attribute table 400 when the source cluster health is degraded

| VM Class | Last Access | Access Frequency | RF | VM Type | Movement Value |
| --- | --- | --- | --- | --- | --- |
| Gold | Hot | High | 1 | Production | Medium |
| Gold | Very cold | High | 2 | Production | Medium |
| Gold | Hot | Medium | 2 | Test | Medium |
| Gold | Cold | Low | 2 | Test | Low |
| Gold | Hot | Medium | 2 | Dev | Medium |
| Silver | Hot | High | 2 | Production | Medium |
| Silver | Hot | Medium | 3 | Production | Medium |
| Silver | Hot | Low | 1 | Dev | Low |
| Bronze | Hot | Low | 3 | Production | Medium |

For the above sub-table, the information gain may be computed for each VM attribute in the above sub-table, as below:

$$H \text{ (Movement Value)}=-7/9*\log_2(7/9)-2/9*\log_2(2/9) \\ =0.764205 \quad (10)$$

$$H \text{ (Movement Value, VM Type)}=5/9*H \text{ (Movement Value}_{Production})+2/9*H \text{ (Movement Value}_{Test})+2/ \\ 9*H \text{ (Movement Value}_{Development}) \quad (11)$$

$$H \text{ (Movement Value}_{Production})=-5/5*\log_2(5/5)=0 \quad (12)$$

$$H \text{ (Movement Value}_{Test})=-1/2*\log_2(1/2)-*\log_2(1/2) \\ =1 \quad (13)$$

$$H \text{ (Movement Value}_{Development})=-*\log_2(1/2)-*\log_2(1/ \\ 2)=1 \quad (14)$$

Therefore, $$H \text{ (Movement Value, VM Type)}=0+2/9+2/ \\ 9=0.444444 \quad (15)$$

$$IG \text{(Movement Value, VM Type)}=0.764205- \\ 0.444444=0.319761 \quad (16)$$

Similarly, other IGs, corresponding to the attributes, i.e., VM class, last access, access frequency, and RF may be computed, and it may be determined that the IG for the VM attribute of "VM type" may be the highest. Accordingly, from the root node 452 of source cluster health, when the classification branches to the category of "degraded", the decision node 454 on such a branch may be determined to the attribute of "VM type".

When the entropy calculated for a VM attribute equals zero, no more branching is to be performed, and a leaf node, that indicates a category of the movement value, is reached. For example, as illustrated by equation (12), H (Movement value Production)=0. Therefore, when the source cluster health is degraded and the VM type is production, the movement value is medium. Therefore, a leaf node 456 of "medium" is reached.

In the manner as explained above, the entropies and information gains are computed iteratively until leaf nodes are arrived at in all branches. For example, a sub-table of table 2 may be generated for the category of "Test" and entropies and information gain may be computed to obtain a further decision node or a leaf node. Upon completion of the iterative process, a leaf node may be reached in all branches of the decision tree 450. This completes the generation of the decision tree 450.

As illustrated, the decision tree 450 indicates the dependence of the movement value of a VM on the various VM attributes of the VM. Further, as will be understood, using the decision tree 450, the movement value for any combination of VM attributes may be determined.

Although the movement model is explained with reference to a decision tree, the movement model may be in any other form that indicates the dependence of the movement value of a VM on its VM attributes. For example, the movement model may be a mathematical model representing the movement value as a mathematical function of the VM attributes. For this, each category of each VM attribute may have a corresponding numerical value and the movement value may be computed as a movement score, where a high score may be indicative of a higher rank in the rank order. Such a mathematical function may be computed using regression. Accordingly, such a model may also be referred to as a regression-based model. In other examples, other types of movement models may be used. Such movement models may include neural network-based model, fuzzy logic-based models, Support Vector Machines (SVM)-based model, boosted tree, random forest, and Adaptive Neuro-Fuzzy Inference System (ANFIS).

Upon its generation, the movement model may be utilized to assign movement values to VMs, such as the first VM 224 and the second VM 226. For this, VM attributes of the VMs that are to be moved may be received. The utilization of the attributes of the VMs to determine the movement values of the VMs allows making a well-informed decision regarding the urgency of moving data of VM. Based on the movement value, the plurality of VMs may then be rank ordered.

In an example, upon determining movement values of the VMs using the movement model, the VM attributes of the VMs and the determined movement values are appended to the VM attribute table 400. Accordingly, the VM attribute table 400 is continuously updated with recent data. Further, based on the updated VM attribute table 400, the movement model may be generated from time to time. This not only ensures updating of the movement model, but also facilitates making the movement model more accurate.

The generation of the movement model based on a plurality of data sets, and continuously updating the movement model, as explained in the above paragraphs, provides an efficient and analytics-based approach for moving VM data.

In some cases, multiple VMs may have the same movement value. For example, three VMs may have the movement value of "High". In such a case, to rank order the VMs having the same movement value, a tie-breaker attribute may be utilized. The tie-breaker attribute may be any of the aforementioned VM attributes. In another example, the tie-breaker attribute may be a size of the VM data. The size of the VM data may indicate the amount of time that may be consumed in movement of the VM data. A VM having a smaller size of VM data may be ranked higher or lower than a VM having a larger size of VM data. Since the size of VM data of different VMs are likely to be different, the size of VM data acts as an effective tie-breaker attribute.

Figure 5:
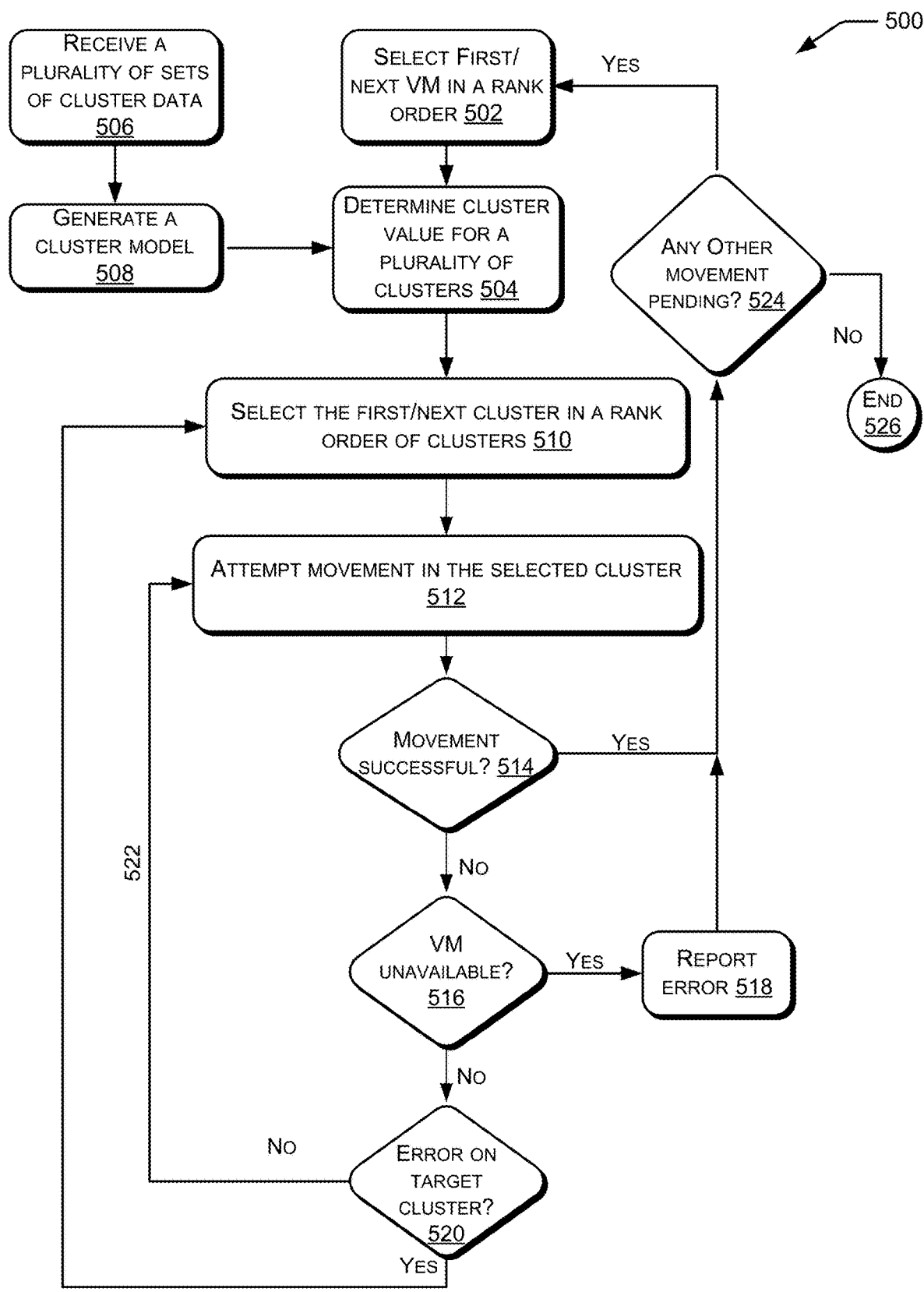
FIG. 5 illustrates a method for selection of a target cluster to which VM data is to be moved, according to an example implementation of the present subject matter.

Upon rank ordering VMs, the VM data of the VMs may be moved in the rank order. In an example, prior to moving the VM data, a cluster to which the VM data is to be moved, i.e., a target cluster, may be selected, as will be explained below:

FIG. 5 illustrates a method 500 for selection of a target cluster to which VM data is to be moved, according to an example implementation of the present subject matter. The method 500 may be performed by the system 100.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

Referring to method 500, at block 502, a first VM in the rank order is selected for movement of its VM data. The first VM may be, for example, the first VM 224. At block 504, a cluster value is determined for a plurality of clusters. The plurality of clusters may include the clusters that are part of the federation of clusters. In an example, the plurality of clusters may include all clusters of the federation other than the source cluster of the first VM, such as the first cluster 202. For example, the plurality of clusters may include the second cluster 204 and the third cluster 206. The cluster value of each cluster may be computed using a cluster model. The cluster model indicates dependence of cluster value of a cluster of a plurality of attributes of the cluster, also referred to as cluster attributes.

Figure 6B:
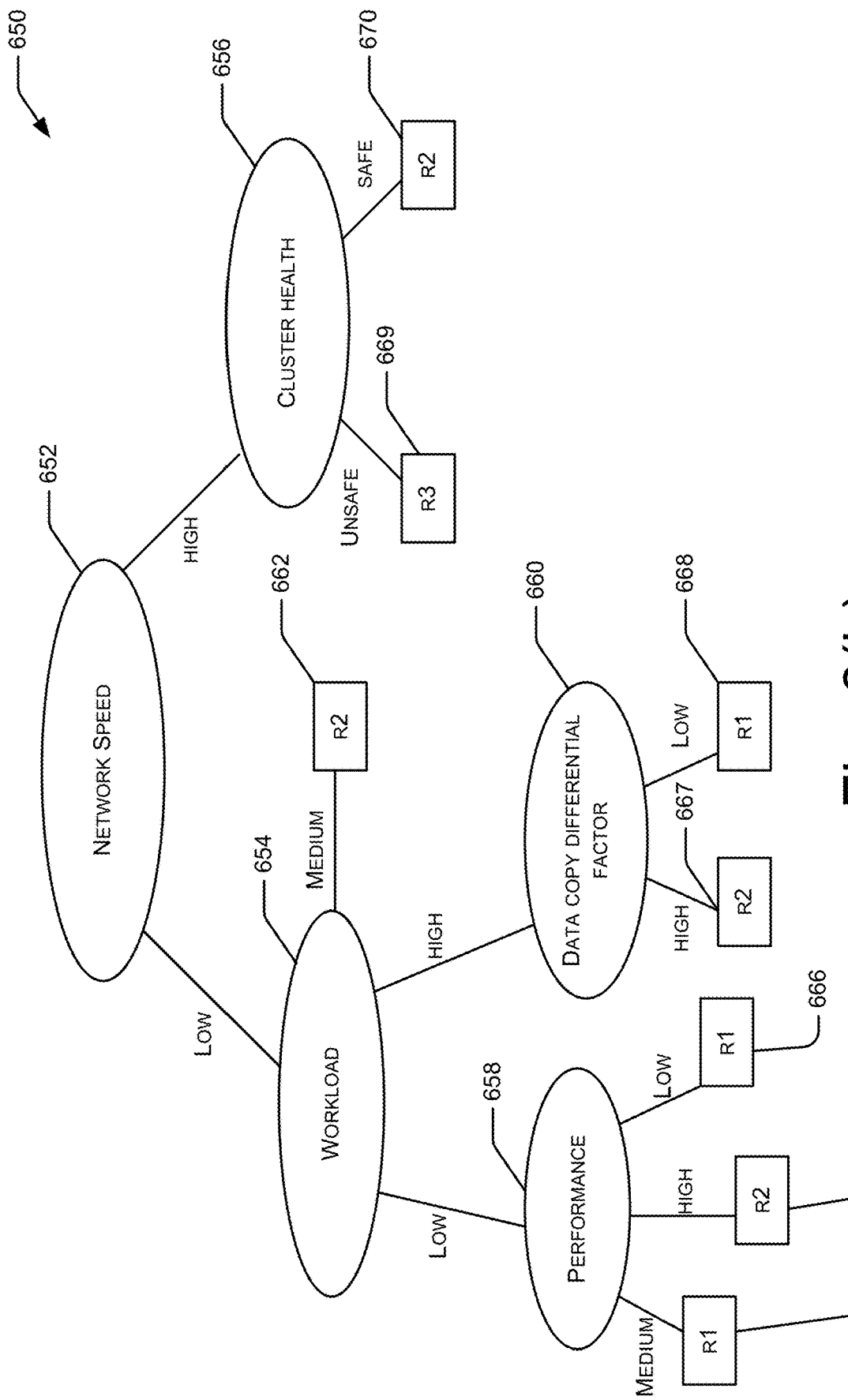
FIG. 6(*a*) illustrates a cluster attribute table having a plurality of sets of cluster data, according to an example implementation of the present subject matter.

For generation of the cluster model, at block 506, a plurality of sets of cluster data is received. The plurality of sets of cluster data may be received, for example, from the knowledgebase 306. Each set of cluster data corresponds to a reference cluster of a plurality of reference clusters. Further, each set of cluster data includes a plurality of cluster attributes of the reference cluster and a reference cluster value of the reference cluster. Based on the plurality of sets of cluster data, at block 508, the cluster model is generated. The steps at blocks 506 and 508 may be performed independently of the other steps of the method 500, as illustrated. The cluster model and generation of the cluster model will be explained in greater detail with reference to FIGS. 6(a) and 6(b).

At block 510, based on the cluster values of the plurality of clusters, a cluster may be selected as the target cluster to which the first VM data is to be moved. For instance, the plurality of clusters may be rank ordered based on their respective cluster values and the topmost cluster in the rank order may be selected as the target cluster.

In an example, the determination of cluster value at block 504, and the consequent rank ordering of the clusters at block 510, may have to be performed prior to each target cluster selection. For instance, the rank ordering the clusters used for selecting target cluster for a one VM data movement may not be used for selecting a target cluster for a subsequent VM data movement. This is because the values of the different cluster attributes, which impact the rank order, may change from time-to-time. Further, some cluster attributes may depend not just on the cluster, but also on the VM that is to be moved. This will be explained in greater detail with reference to FIG. 6(a).

Subsequently, at block 512, the movement of the first VM data may be attempted in the target cluster and at block 514, it is checked as to whether the movement is successful. If movement is unsuccessful, at block 516, it is checked if the first VM is unavailable. If the first VM is unavailable, at block 518, an error is reported. If the first VM is available, at block 520, it is checked as to whether the failure of movement is due to an error of the target cluster. If the failure is due to the error of the target cluster, at block 510, a next cluster may be selected as the target cluster for the movement. If, however, the failure is not due to the error of the target cluster, the movement is re-attempted at the originally selected target cluster, as illustrated by the arrow 522.

If, at block 514, it is determined that the movement is successful, at block 524, it is checked whether any other movement is yet to be performed. For instance, it is checked as to whether movement of data of all VMs present in the rank order is performed or not. If, at block 524, it is determined that movement is pending, at block 502, a next VM in the rank order is selected for movement of its data and the subsequent steps are performed. Otherwise, if it is determined that no movement is pending, at block 526, the method 500 completes.

In the above manner, VM data of each VM in the rank order is moved to a target cluster selected for the VM based on the cluster model. Therefore, the present subject matter facilitates moving VM data to clusters that are most suited to store the VM data. This ensures that the performance of the VMs, upon their movement to their respective target clusters, meet the SLA parameters.

In addition to the selection of the target cluster, in an example, a target node may be selected in the target cluster to which the VM data is to be moved. Such a selection of the target node may be performed based on various parameters of each node in the target cluster.

In an example, the cluster model may be generated in a manner similar to the generation of the movement model. For example, a plurality of sets of cluster data in a cluster attribute table that is similar to the VM attribute table 400 may be received from the knowledgebase 306. From the cluster attribute table, a decision tree, similar to the decision tree 450, may be generated. Such a decision tree may be used as the cluster value model. The cluster attribute table and the cluster value model, according to some examples, will be explained below.

FIG. 6(*a*) illustrates a cluster attribute table 600 having the plurality of sets of cluster data, according to an example implementation of the present subject matter. Each row of the cluster attribute table 600 may correspond to a reference cluster. Further, each column may correspond to an attribute of the reference cluster. The attributes of a cluster may include attributes that determine the suitability of the cluster to store VM data of a VM and/or suitability of the cluster to host the VM. In an example, the attributes may include health of the cluster, network speed of the cluster, workload of the cluster, and performance of the cluster.

The health of the cluster may correspond to health of nodes and components of the cluster. The health of the cluster in the near future may be predicted using various parameters of the cluster. Accordingly, the health of the cluster may be categorized as "safe" or "unsafe" based on the prediction. The network speed may refer to a speed at which the cluster can receive data. The network speed may be categorized as "high" or "low". The workload of the cluster may correspond to an amount of processor, memory, or storage of the cluster that is being consumed. The workload may be categorized as "high", "medium", or "low". The performance of the cluster may include, for example, a speed at which the cluster services I/O requests. As will be appreciated, the aforementioned cluster attributes indicate how effectively a cluster can handle the VM data and host the VM. Further, the consideration of the workload of a cluster for determining the cluster value also ensures uniform loading of the clusters in a federation. In an example, in addition to the above cluster attributes, a predicted storage consumption of a cluster, which may be determined based on a rate of growth of storage consumption of the cluster, may also be used as a cluster attribute.

In an example, the cluster attributes may include attributes that depend both on the cluster and the VM for which the VM data is to be moved. Such attributes indicate the suitability of the cluster to host a particular VM or to store the VM data or may indicate the compatibility between the VM/VM data and the cluster. For example, the cluster attributes may include a data copy differential factor that indicates the amount of the VM data already present in a cluster. If cluster already has a portion of the VM data, the remainder of the VM data, i.e., differential data, alone is to be moved from the source cluster, and the data already present in the cluster may be de-duplicated. Accordingly, the data copy differential factor of a cluster corresponding to a VM may be categorized as "high" or "low". Further, the network speed of the cluster may refer to speed at which data can be transferred between the source cluster of the VM and a particular cluster.

Since the cluster attributes may include attributes that depend both on the cluster and the VM, a cluster value of a cluster may be unique to a particular VM. Accordingly, the rank ordering of clusters may change based on the VM for which the movement is to be performed. Further, some cluster attributes, such as workload of the cluster, health of the cluster, performance of the cluster, and network speed of the cluster, may change from time-to-time. Therefore, the rank order of the clusters may have to be computed for each VM for which movement is to be performed.

In an example, a row of the cluster attribute table 600 corresponding to a reference cluster includes a cluster value for the reference cluster, also referred to as a reference cluster value. Similar to the reference movement values, the reference cluster value may also be pre-assigned. The reference cluster value may be in the form of a rank, such as R1, R2, and R3.

Similar to the VM attribute table 400, the cluster attribute table 600 also does not provide meaningful insights into the degree of impact of each cluster attribute on the eventual cluster value. Accordingly, the cluster model, which indicates the dependence of the cluster value of a cluster on each of its cluster attributes, may be generated based on the plurality of sets of cluster data in the cluster attribute table 600. The cluster model may be a decision tree, and may be generated from the cluster attribute table 600 in the manner similar to decision tree 450.

FIG. 6(*b*) illustrates the decision tree 650, according to an example implementation of the present subject matter. As illustrated, the root node 652 may be the network speed of the cluster and the other cluster attributes may be the various decision nodes 654-660. Further, the leaf nodes 662-670 may be the cluster value, i.e., R1, R2, and R3. Using the decision tree 650 and using the cluster attributes of a cluster, cluster value of a cluster of the federation may be determined.

Figure 7:
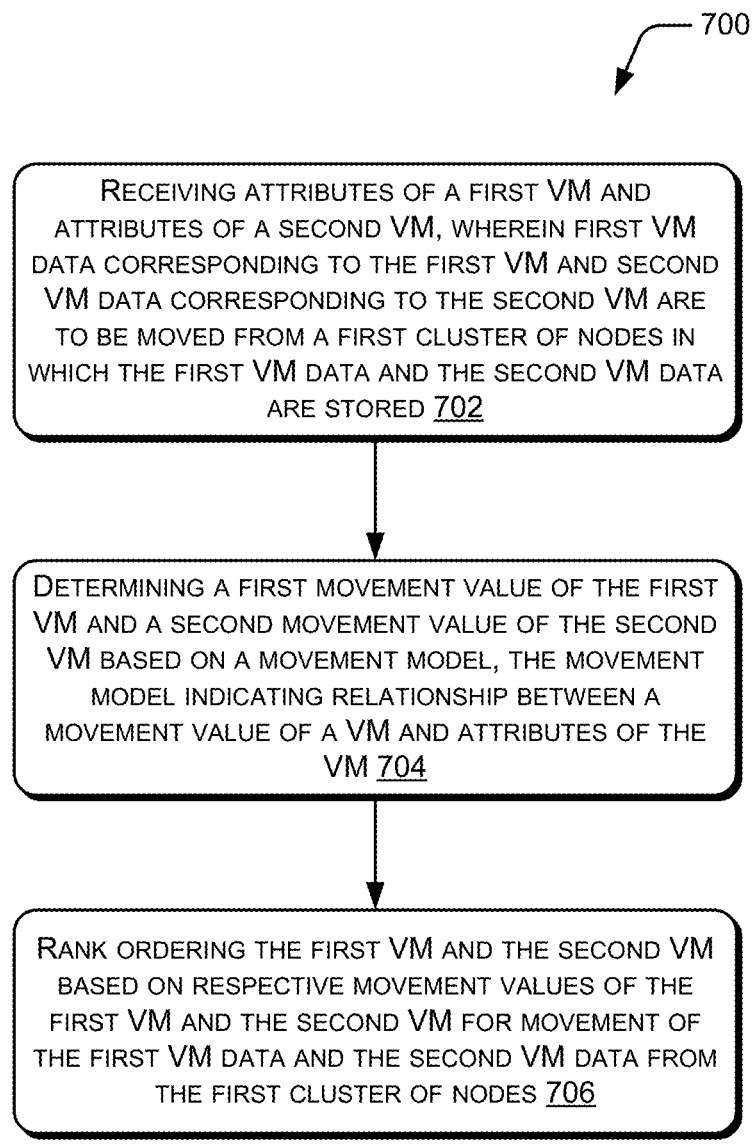
FIG. 7 illustrates a method for facilitating movement of VM data corresponding to a VM across clusters of nodes, according to an example implementation of the present subject matter.

FIG. 7 illustrates a method 700 for facilitating movement of VM data corresponding to a VM across clusters of nodes, according to an example implementation of the present subject matter.

The order in which the method 700 is described is not intended to be construed as a limitation, and any number of the described method blocks may be combined in any order to implement the method 700, or an alternative method. Furthermore, the method 700 may be implemented by processor(s) or computing device(s) through any suitable hardware, non-transitory machine-readable instructions, or a combination thereof.

It may be understood that steps of the method 700 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 700 may be implemented in a variety of systems; the methods 700 are described in relation to the aforementioned system 100, for ease of explanation. In an example, the steps of the method 700 may be performed by a processing resource, such as the processor 102.

Referring to method 700, at block 702, attributes of a first VM and attributes of a second VM are received. The first VM and second VM may be, for example, the first VM 224 and second VM 226, respectively. A first set of VM data, also referred to as first VM data, corresponding to the first VM and second VM data corresponding to the second VM are to be moved from a first cluster of nodes in which the first VM data and the second VM data are stored. The first VM data may be, for example, the first VM data 228, and the second VM data may be, for example, the second VM data

230. Further, the first cluster of nodes, also referred to as a first cluster may be, for example, the first cluster 202.

At block 704, a first movement value of the first VM and a second movement value of the second VM are determined based on a movement model. The movement model indicates relationship between a movement value of a VM and attributes of the VM. The attributes of the VM may include, for example, replication factor, frequency of access, VM type, last access, VM class, and health of a cluster of nodes that hosts the VM. The movement model may be, for example, a decision tree (such as the decision tree 450), a regression-based model, neural network-based model, fuzzy logic-based model, Support Vector Machines (SVM)-based model, boosted tree, random forest, and Adaptive Neuro-Fuzzy Inference System (ANFIS).

In an example, to generate the movement model, the method includes receiving a plurality of sets of VM attribute data. Each set of VM attribute data corresponds to a reference VM of a plurality of reference VMs. Further, each set of VM attribute data includes a plurality of attributes of the reference VM and a reference movement value of the reference VM. The plurality of sets of VM attribute data may be, for example, the sets of VM attribute data present in the VM attribute table 400. Based on the plurality of sets of VM attribute data, the movement model may then be generated. The generation of the movement model may be performed in the manner as explained with reference to FIG. 4(*b*).

At block 706, the first VM and the second VM are rank ordered based on respective movement values of the first VM and the second VM for movement of the first VM data and the second VM data from the first cluster of nodes. For instance, the first VM may be ranked above or below the second VM and the first VM data may be moved from the first cluster before or after the second VM data based on the ranking.

The method 700 may include selecting a second cluster of nodes to which the first VM data is to be moved from among a plurality of target clusters. The second cluster may be selected based on a first cluster value of each of the plurality of target clusters. Further, the method 700 may also include selecting a third cluster of nodes to which the second VM data is to be moved based on a second cluster value of each of the plurality of clusters of nodes. Here, the first cluster value refers to the cluster value determined for each target cluster prior to movement of the first VM data. Similarly, the second cluster value refers to the cluster value determined for each target cluster prior to movement of the first VM data. As explained with reference to FIG. 5, the cluster value for each cluster may be determined prior to movement of each set of VM data, as cluster attributes, based on which the cluster values are determined, may vary from time to time and may vary based on the VM for which the movement is to be performed.

In an example, the first cluster value and second cluster value of the target clusters may be determined based on a cluster model. The cluster model indicates dependence of a cluster value of a target cluster on a plurality of attributes of the target cluster. The cluster model may be one of, for example, a decision tree (such as the decision tree 650), a regression-based model, neural network-based model, fuzzy logic-based model, SVM-based model, boosted tree, random forest, and ANFIS.

The cluster attributes may include, for example, health of the cluster, network speed of the cluster, workload of the cluster, and performance of the cluster. Further, as explained earlier, the cluster attributes may include attributes that depend both on the cluster and a source VM for which the VM data is to be moved. For example, the cluster attributes may include a data copy differential factor, which indicates an amount of data to be transferred to the target cluster for moving data of the source VM. Accordingly, the cluster value of a target cluster may be referred to as a cluster value of the target cluster corresponding to the source VM.

Figure 8:
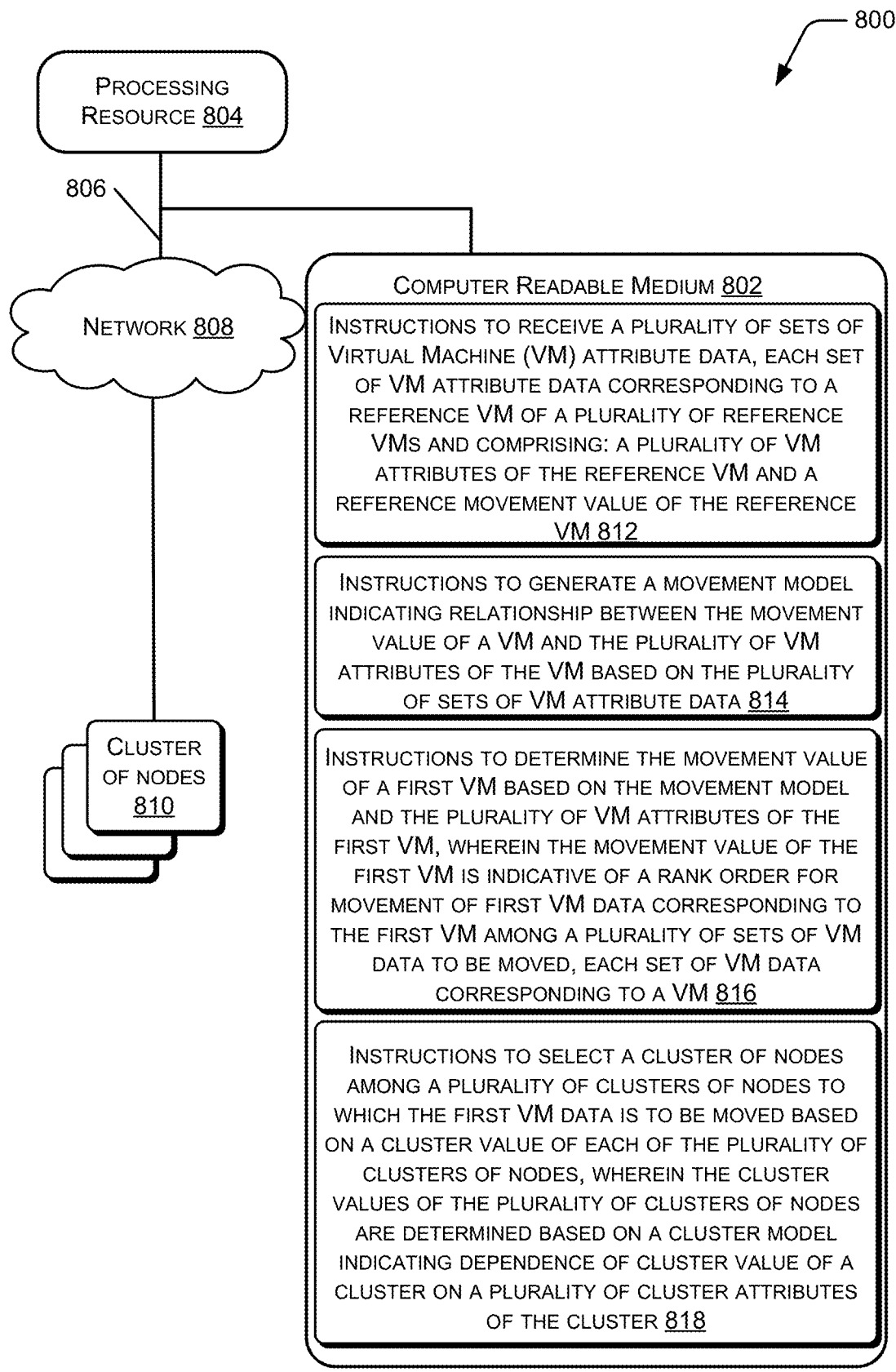
FIG. 8 illustrates a computing environment, implementing a non-transitory computer-readable medium for facilitating movement of VM data corresponding to a VM across clusters of nodes, according to an example implementation of the present subject matter.

FIG. 8 illustrates a computing environment 800, implementing a non-transitory computer-readable medium for facilitating movement of VM data corresponding to a VM across clusters of nodes, according to an example implementation of the present subject matter.

In an example, the non-transitory computer-readable medium 802 may be utilized by a system, such as the system 100. The system 100 may be implemented in a public networking environment or a private networking environment. In an example, the computing environment 800 may include a processing resource 804 communicatively coupled to the non-transitory computer-readable medium 802 through a communication link 806.

In an example, the processing resource 804 may be implemented in a system, such as the system 100. The processing resource 804 may be the processor 102. The non-transitory computer-readable medium 802 may be, for example, an internal memory device or an external memory device. In one implementation, the communication link 806 may be a direct communication link, such as any memory read/write interface. In another implementation, the communication link 806 may be an indirect communication link, such as a network interface. In such a case, the processing resource 804 may access the non-transitory computer-readable medium 802 through a network 808. The network 808 may be a single network or a combination of multiple networks and may use a variety of different communication protocols.

The processing resource 804 and the non-transitory computer-readable medium 802 may also be communicatively coupled to clusters of nodes 810 over the network 808. The clusters of nodes 810 may be, for example, part of a hyperconverged system, and may be, for example, include the first cluster 202, second cluster 204, and third cluster 206.

In an example implementation, the non-transitory computer-readable medium 802 includes a set of computer-readable instructions to determine movement values for VMs. The set of computer-readable instructions can be accessed by the processing resource 804 through the communication link 806 and subsequently executed to perform acts to assign movement values for the VMs.

Referring to FIG. 8, in an example, the non-transitory computer-readable medium 802 includes instructions 812 that cause the processing resource 804 to receive a plurality of sets of Virtual Machine (VM) attribute data. Each set of VM attribute data corresponds to a reference VM of a plurality of reference VMs and includes a plurality of VM attributes of the reference VM and a reference movement value of the reference VM. The plurality of sets of VM attribute data may be, for example, the sets of VM attribute data present in the VM attribute table 400. Further, the plurality of VM attributes includes replication factor, frequency of access, VM type, last access, VM class, and health of a cluster of nodes that hosts the VM.

The non-transitory computer-readable medium 802 includes instructions 814 that cause the processing resource 804 to generate a movement model that indicates relationship between the movement value of a VM and the plurality of VM attributes of the VM based on the plurality of sets of VM attribute data. The movement model may be one of a decision tree, regression-based model, neural network-based model, fuzzy logic-based model, Support Vector Machines (SVM)-based model, boosted tree, random forest, and Adaptive Neuro-Fuzzy Inference System (ANFIS). For example, the movement model may be the decision tree 450.

The non-transitory computer-readable medium 802 includes instructions 816 that cause the processing resource 804 to determine the movement value of a first VM based on the movement model and the plurality of VM attributes of the first VM. The movement value of the first VM is indicative of a rank order for movement of first VM data corresponding to the first VM among a plurality of sets of VM data to be moved, where each set of VM data corresponding to a VM. The first VM data may be, for example, the first VM data 228. Further, the plurality of sets of VM data may include, for example, the first VM data 228 and the second VM data 230. Based on the rank order, the first VM data 228 may be moved before or after the second VM data 230.

The non-transitory computer-readable medium 802 includes instructions 818 that cause the processing resource 804 to select a cluster of nodes among a plurality of clusters of nodes to which the first VM data is to be moved. The selection may be performed based on a cluster value of each of the plurality of clusters of nodes. The cluster values of the plurality of clusters of nodes are determined based on a cluster model which indicates dependence of cluster value of a cluster on a plurality of cluster attributes of the cluster. The cluster model may be one of a decision tree, regression-based model, neural network-based model, fuzzy logic-based model, Support Vector Machines (SVM)-based model, boosted tree, random forest, and Adaptive Neuro-Fuzzy Inference System (ANFIS). For example, the cluster model may be the decision tree 650.

The present subject matter provides an efficient manner of ordering data of VMs for their movement. Since VMs are ranked based on their respective attributes for movement of data associated with the VMs, the present subject matter ensures that data of VMs of a higher priority are moved earlier. For example, data of a VM servicing greater number of I/O requests may be moved prior to data of a VM serving lesser number of I/O requests. This may reduce downtime of VMs.

Further, the present subject matter provides an automated manner of ordering VMs for moving data of the VMs. For instance, an administrator of a data center does not have to determine the order of movement of VM data. Therefore, a large number of VM attributes can be considered for ranking the VMs, thereby making the movement process highly efficient. Further, the automated manner also prevents errors associated with manual ordering of the VMs. The movement process of the present subject matter also facilitates complying with the various Service Level Agreement (SLA) parameters of the VMs.

Although implementations of movement of virtual machine data across clusters of nodes have been described in language specific to structural features and/or methods, it is to be understood that the present subject matter is not necessarily limited to the specific features or methods described. Rather, the specific features and methods are disclosed and explained as example implementations.

The invention claimed is:
1. A system comprising:
   a processor; and
   a memory coupled to the processor, the memory storing instructions executable by the processor to:
      receive Virtual Machine (VM) attributes of a first VM, wherein first VM data corresponding to the first VM is to be moved from a first cluster of nodes in which the first VM data is stored; and
      determine a movement value of the first VM based on a movement model and the VM attributes of the first VM, the movement model indicating dependence of movement value of a VM on VM attributes of the VM, wherein the movement value of the first VM is indicative of a rank order for movement of the first VM data among a plurality of sets of VM data to be moved, each set of VM data corresponding to a VM, wherein to generate the movement model:
      receive a plurality of sets of VM attribute data, each set of VM attribute data corresponding to a reference VM of a plurality of reference VMs and comprising: a plurality of VM attributes of the reference VM and a reference movement value of the reference VM; and
      model dependence of movement value of a VM on the plurality of VM attributes of the VM based on the plurality of sets of VM attribute data.

2. The system of claim 1, wherein the VM attributes of the first VM comprises replication factor of the first VM, frequency of access of the first VM, VM type of the first VM, last access of the first VM, VM class of the first VM, and health of the first cluster, which hosts the first VM.

3. The system of claim 1, wherein the instructions are executable by the processor to update the plurality of sets of VM attribute data with the VM attributes of the first VM and the movement value assigned to the first VM.

4. The system of claim 1, wherein the instructions are executable by the processor to:
   determine cluster value for each of a plurality of clusters using a cluster model, the cluster model indicating dependence of cluster value of a cluster on a plurality of attributes of the cluster; and
   select a target cluster from among the plurality of clusters to which the first VM data is to be moved based on respective cluster values of the plurality of clusters.

5. The system of claim 4, wherein the instructions are executable by the processor to:
   receive a plurality of sets of cluster data, each set of cluster data corresponding to a reference cluster of a plurality of reference clusters and comprising: a plurality of cluster attributes of the reference cluster and a reference cluster value of the reference cluster; and
   generate the cluster model based on the plurality of sets of cluster data.

6. The system of claim 4, wherein the plurality of cluster attributes comprises workload of the cluster, health of the cluster, performance of the cluster, and network speed of the cluster.

7. The system of claim 4, wherein the plurality of clusters of nodes is part of a hyperconverged system.

8. The system of claim 1, wherein the movement model is one of a decision tree, a regression-based model, neural network-based model, fuzzy logic-based model, Support Vector Machines (SVM)-based model, boosted tree, random forest, and Adaptive Neuro-Fuzzy Inference System (ANFIS).

9. The system of claim 1, wherein the instructions are executable by the processor to:
   rank order the first VM and a second VM based on respective movement values of the first VM and the second VM, wherein second VM data corresponds to the second VM, is stored in the first cluster of nodes, and is to be moved from the first cluster of nodes;

move the first VM data and the second VM data in the rank order.

10. The system of claim 9, wherein the instructions are executable to initiate determination of movement values of the first VM and the second VM in response to a detection of degradation in health of the first cluster of nodes.

11. A method comprising:

receiving a plurality of sets of VM attribute data, each set of VM attribute data corresponding to a reference VM of a plurality of reference VMs and comprising: a plurality of attributes of the reference VM and a reference movement value of the reference VM;

generating a movement model based on the plurality of sets of VM attribute data;

receiving, by a processing resource, attributes of a first VM and attributes of a second VM, wherein first VM data corresponding to the first VM and second VM data corresponding to the second VM are to be moved from a first cluster of nodes in which the first VM data and the second VM data are stored;

determining, by the processing resource, a first movement value of the first VM and a second movement value of the second VM based on the movement model, the movement model indicating relationship between a movement value of a VM and attributes of the VM; and rank ordering, by the processing resource, the first VM and the second VM based on respective movement values of the first VM and the second VM for movement of the first VM data and the second VM data from the first cluster of nodes.

12. The method of claim 11, wherein the attributes of the first VM comprises replication factor of the first VM, frequency of access of the first VM, VM type of the first VM, last access of the first VM, VM class of the first VM, and health of the first cluster, which hosts the first VM.

13. The method of claim 11, comprising:

selecting, by the processing resource, a second cluster of nodes to which the first VM data is to be moved from among a plurality of clusters based on a first cluster value of each of the plurality of clusters;

selecting, by the processing resource, a third cluster of nodes to which the second VM data is to be moved from among the plurality of clusters based on a second cluster value of each of the plurality of clusters.

14. The method of claim 13, comprising determining the first cluster value and second cluster value of each of the plurality of clusters based on a cluster model, the cluster model indicating dependence of a cluster value of a cluster corresponding to a source VM for which VM data is to be moved on a plurality of attributes of the cluster.

15. The method of claim 14, wherein each of the movement model and the cluster model is one of a decision tree, a regression-based model, neural network-based model, fuzzy logic-based model, Support Vector Machines (SVM)-based model, boosted tree, random forest, and Adaptive Neuro-Fuzzy Inference System (ANFIS).

16. A non-transitory computer-readable medium comprising instructions for facilitating movement of virtual machine (VM) data, the instructions being executable by a processing resource to:

receive a plurality of sets of Virtual Machine (VM) attribute data, each set of VM attribute data corresponding to a reference VM of a plurality of reference VMs and comprising: a plurality of VM attributes of the reference VM and a reference movement value of the reference VM;

generate a movement model indicating relationship between the movement value of a VM and the plurality of VM attributes of the VM based on the plurality of sets of VM attribute data;

determine the movement value of a first VM based on the movement model and the plurality of VM attributes of the first VM, wherein the movement value of the first VM is indicative of a rank order for movement of first VM data corresponding to the first VM among a plurality of sets of VM data to be moved, each set of VM data corresponding to a VM; and select a cluster of nodes among a plurality of clusters of nodes to which the first VM data is to be moved based on a cluster value of each of the plurality of clusters of nodes, wherein the cluster values of the plurality of clusters of nodes are determined based on a cluster model indicating dependence of cluster value of a cluster on a plurality of cluster attributes of the cluster.

17. The non-transitory computer-readable medium of claim 16, wherein the plurality of VM attributes comprises replication factor, frequency of access, VM type, last access, VM class, and health of a cluster of nodes that hosts the VM.

18. The non-transitory computer-readable medium of claim 16, wherein each of the movement model and the cluster model is one of a decision tree, regression-based model, neural network-based model, fuzzy logic-based model, Support Vector Machines (SVM)-based model, boosted tree, random forest, and Adaptive Neuro-Fuzzy Inference System (ANFIS).

\* \* \* \* \*